United States Patent
Koe

[15] 3,686,414
[45] Aug. 22, 1972

[54] P-CHLOROBENZYL COMPOUNDS AND THEIR SEROTONIN LOWERING ABILITY

[72] Inventor: Billie Kenneth Koe, Chas Pfizer & Co., Inc., 235 E. 42nd St., New York, N.Y. 10017

[22] Filed: March 6, 1969

[21] Appl. No.: 805,034

Related U.S. Application Data

[63] Continuation-in-part of Ser. No. 614,418, Feb. 7, 1967, abandoned, which is a continuation-in-part of Ser. No. 495,337, Oct. 12, 1965, abandoned.

[52] U.S. Cl. .................................................. 424/319
[51] Int. Cl. ............................................... A61k 27/00
[58] Field of Search ....................................... 424/319

[56] References Cited

OTHER PUBLICATIONS

Durham, Encyclopedia of Medical Syndromes, 1960, pp. 554–556
Chemical Abstracts 55: 371(b) (1961)
Shore, Pharmacological Rev. 14:4 pp. 531–540 (1962)
Udenfriend, Ann N.Y. Acad, Sci. Annals, Vol. 66, pp. 602–606 (1957)

Primary Examiner—Stanley J. Friedman
Attorney—Connolly and Hutz

[57] ABSTRACT p-chlorophenylalanine and its pharmaceutically-acceptable acid addition salts are useful in relieving the symptoms of the carcinoid tumor syndrome.

1 Claim, No Drawings

P-CHLOROBENZYL COMPOUNDS AND THEIR SEROTONIN LOWERING ABILITY

This application is a continuation-in-part of copending application Ser. No. 614,418, filed Feb. 7, 1967, which was in turn a continuation-in-part of application Ser. No. 495,337, filed Oct. 12, 1965. Both of those prior applications are now abandoned.

This invention is concerned with useful organic medicinal agents. In particular, it is concerned with a method which effectively lowers serotonin levels in the body and alleviates the symptoms of the carciniod tumor syndrome.

The novel method disclosed herein relates to the role played by 5-hydroxytryptamine (Serotonin) in the central nervous system, peripheral tissue and organs. The possibility of selectively depleting brain serotonin has heretofore been of great interest in psychopharmacology, both for theoretical reasons and, more practically, as a potential basis for the development of new psychotherapeutic agents. Up to now, one of the most effective ways for selectively depleting 5-hydroxytryptamine (5-HT) particularly in the brain was accomplished by long-term (2 to 8 weeks) feeding of tryptophane-free diets. The mechanism of such 5-HT) depletion was, of course, the shutdown of biosynthesis because of the absence of precursor, i.e., tryptophane.

The ability of the herein disclosed compounds to profoundly lower 5HT) levels in various tissues should prove to be beneficial in various disease states. For instance, it has been found that the subject compound alleviates many of the symptoms associated with carcinoid tumor syndrome in humans.

Increased production of serotonin is characteristic of carcinoids and a carcinoid syndrome develops which is manifested by gastrointestinal disturbances such as nausea, vomiting, diarrhea and water stools. Blotchy flushing of the skin also appears.

In accordance with the present invention, the novel method comprises the step of administering to the host an effective amount of p-chlorophenylalanine and the pharmaceutically-acceptable acid addition salts thereof.

Historically, p-chlorophenylalanine is well known. However, the novel method of using it as described in the instant invention has never been contemplated.

This compound has been found to effect a surprisingly long-lasting, selective, and profound lowering of brain 5-hydroxytryptamine concentrations with a lesser lowering in the peripheral tissues, whole blood, the spleen and colon. The results obtained up to now strongly indicated that the mechanism of the aforesaid depletion is the biosynthetic inhibition of the formation of 5-hydroxytryptamine either by inhibition of tryptophan hydroxylation or by inhibition of percursor transfer into the cellular site of biosynthesis.

A suitable preparation of p-chlorophenylalanine is reported in J.A.C.S. 73, 56 (1951) which entails the basic condensation of diethyl acetamidomalonate with p-chlorobenzl chloride to yield diethyl p-chlorobenzyl acetamidomalonate. Said resulting product is then treated with hydrobromic acid followed by treatment with ammonium hydroxide to provide the desired product p-chlorophenylalanine.

The acids which are used to prepare the pharmaceutically-acceptable acid addition salts, must, of course, be those which necessarily form non-toxic acid addition salts. Exemplary of such organic salts are those with maleic, fumaric, benzoic, ascorbic, pamoic, succinic, methanesulfonic, acetic, propionic, tartaric, salicyclic, citric, gluconic, lactic, malic, aspartic, itaconic and glutamic acids. Exemplary of such inorganic salts are those with hydrochloric, hydrobromic, sulfuric, sulfamic, phosphoric and nitric acids.

The compound used for the purpose of this invention can be administered either alone or preferably in combination with a pharmaceutically-acceptable carrier. It may be combined with various pharmaceutically-acceptable inert carriers in the form of tablets, capsules, lozenges, troches, hard candies, powders, sprays, aqueous suspensions, or solutions, injectable solutions, elixirs, syrups, nd the like. Such carriers include solid diluents, or fillers, sterile aqueous media and various non-toxic organic solvents. Moreover, the oral pharmaceutical compositions of this invention may be suitably sweetened and flavored by means of various agents of the type commonly employed for just such a purpose.

For purposes of parenteral administration and inhalation, solutions or suspensions of the herein described compound in sesame or peanut oil or in aqueous propylene glycol solution can be employed, as well as sterile aqueous solutions of the corresponding water-soluble addition salts previously enumerated. These particular solutions are especially suited for intramuscular and subcutaneous injection purposes. The aqueous solution, including those of the addition salts dissolved in pure distilled water, are additionally useful for intravenous injection purposes provided that their pH be properly adjusted before hand. Such solutions should also be suitably buffered, if necessary, and the liquid diluent first rendered isotonic with sufficient saline or glucose.

When administered to humans orally or parenterally, the effective average daily dose is suitably between about 50 mg. per day and about 5,000 mg. per day. The dosage can be taken at one time or divided dosages can be taken at different times during the day. On a body-weight basis, a dosage of about 1 to about 70 mg./kg. per day is appropriate.

The physician will determine the dosage which will be most suitable for an individual patient and this will vary will age, the weight and response of the particular patient. The above dosages are exemplary of the average host. There can, of course, be individual cases where higher or lower dosage ranges are merited, and such are within the scope of this invention.

For purposes of determining the effectiveness of the compounds herein, in vivo experiments were carried out with mice, rats and dogs. The mice and rats were injected intraperitoneally with saline solutions or suspensions of test compounds at a volume of 10 ml./kg. whereas dogs were dosed orally with capsules. Individual whole rat brains or three pooled whole mouse brains were assayed in order to determine the level of brain 5-hydroxytryptamine. For tissue 5-hydroxytryptamine determinations in dogs, subjects, were killed by rapid intravenous pentobarbital injection. Samples of caudate tissue, hypothalamus and thalamus were removed within 15 minutes of death and frozen in a dry ice-acetone bath for subsequent amine determinations. Spleen and intestine were removed and frozen within 30 minutes after death.

As mentioned earlier, 5HT concentrations were also reduced, but to a lesser extent, in whole blood. Accordingly, this observation affords a means of correlating the depletion in the brain, where said depletion is more dramatic, with that in the blood. Hence, whole blood can be assayed for 5HT by known methods, providing a convenient and systematic method of predicting with reasonable assurance the reduction found in the brain.

Administration of p-chlorophenylalanine in doses up to 4.0 gm. per day to five patients with the carcinoid tumor syndrome reduced urinary excretion of 5-hydroxyindole acetic acid (5-H1AA) by 72 to 88 percent. Evidence that the inhibition of 5-hydroxyindole biosynthesis was occurring at the tryptophan hydroxylase step was obtained in one of the patients whose tumor produced 5-hydroxytryptophan. Treatment with p-chlorophenylalanine appeared to relieve gastrointestinal symptoms in four of five patients.

Since increased amounts of urinary 5-hydroxylated indole derivatives are found in patients with carcinoid syndrome; the use of p-chlorophenylalanine in these patients to control this impairment in tryptophan metabolism was evaluated in a 70 year old man the administration of varying does up to 200 mg. per day. The daily urinary excretion of 5-hydroxylated indole derivatives was greatly reduced after one week treatment as was the occurrence of daily flushing; which decreased from several daily flushes to zero to three daily.

The following examples are provided by way of illustration and should not be interpreted as limiting the invention, many variations of which are possible without departing from the spirit or scope thereof.

EXAMPLE I

Preparation of p-Chlorophenylalanine

A mixture containing 7.84 l. of 48 percent hydrobromic acid, 1.71 l. of water and 2,605 g., 7.63M of diethyl p-chlorobenzylacetamidomalonate is stirred as the temperature is raised slowly to 105°C. and maintained there for 3 hours. The resulting clear, amber solution is then heated at 116°C. for 3 hours during which period volatile components are allowed to distill out (about 700 ml. distillate collected). Upon cooling to room temperature, the product precipitated as the hydrobromide salt. It is collected, dissolved in 24 l. of water at 90°C., and the free amino acid product reprecipitated by addition of ammonium hydroxide to pH 6.2. Upon cooling, the product is collected, washed and dried affording 2,662 g. (87.5 percent) of product, M.P. 263°–264°C.

Anal. Calc'd. for $C_9H_{10}ClNO_2$: C, 54.15; H, 5.01; Cl, 17.76; N, 7.03

Found: C, 54.14; H, 4.92; Cl, 17.83; N, 7.05

EXAMPLE II p-chlorophenylalanine may be converted to acid addition salts in the following manner: to a methanolic solution containing p-chlorophenylalanine (1M) is added a stoichiometric equivalent amount of a suitable acid. The resulting solution is subsequently stripped free of solvent and the precipitate, i.e., acid addition salt is filtered and dried. Other suitable solvents, for example, ethanol, water or mixture thereof may be utilized. The following acid addition salts are typical examples prepared by the above procedure and virtually quantitative yields are obtained:

p-chlorophenyalanine hydrochloride
p-chlorophenylalanine hydrobromide
p-chlorophenylalanine hydroiodide
p-chlorophenylalanine tartrate

EXAMPLE III

The acid addition salts of p-chlorophenyalanine are converted to the corresponding free base in the following manner:

To the acid addition salt dissolved in water is added a 5N sodium hydroxide solution until a pH of about 9.5 to about 10 is attained and then extracting the mixture with chloroform. The organic phase is separated, dried and stripped free of solvent leaving the desired product.

EXAMPLE IV

The following table illustrates the effect of p-chlorophenylalanine on the 5-hydroxytryptamine content of mouse brain:

| Treatment | 5-HT level $-\mu g/g$ |
|---|---|
| saline pH 1.5 (control) | .51 ± .01 |
| p-chlorophenylalanine | .13 ± .01 |

Mice are Charles river males, Swiss CD strain, weighing 16–22 g.

p-chlorophenylalanine (316 mg./kg. pH 1.5) was administered intraperitoneally daily for 3 consecutive days. Mice were sacrificed 24 hours after last p-chlorophenylalanine injection. The above results indicated the effectiveness of p-chlorophenylalanine in lowering mouse brain 5-HT levels.

EXAMPLE V

The table below illustrates the ability of p-chlorophenylalanine in depleting brain 5HT of rats after administration of increasing doses:

| Brain 5HT as per cent of control at dose (mg.kg.) | | |
|---|---|---|
| 32 | 100 | 316 |
| 83 | 54 | 19 |

The 5–HT brain levels are measured 24 hours after intraperitoneal injection. It is observed that increasing dose levels of test compounds strikingly decrease the 5-hydroxytryptamine levels.

EXAMPLE VI

The table below illustrates the ability of p-chlorophenylalanine to inhibit rat liver tryptophane hydroxylase in vitro:

| % Inhibition at Molar Concentration | | |
|---|---|---|
| $10^{-3}$ | $10^{-4}$ | $10^{-5}$ |
| 96 | 55 | 9 |

The incubation conditions consisted of: 1 hour at 37°C. under oxygen.

EXAMPLE VII

The table below demonstrates the effectiveness of p-chlorophenylalanine in lowering 5-HT levels in different regions of dog brain:

| Treatment | wt. kg. (male) | Cerebellum µg./g. | Caudate nucleus µg./g. | Hypothalamus µg./g. | Thalamus µg./g. | Cortex µg./g. |
|---|---|---|---|---|---|---|
| Control | 9.5 | 0.08 | 0.68 | 0.94 | 0.59 | 0.03 |
| Control | 12.5 | 0.41 | 0.68 | 1.82 | 0.84 | 0.16 |
| A. p-chlorophenylalanine | 9.4 | 0.05 | 0.34 | 0.35 | 0.25 | 0.02 |
| B. p-chlorophenylalanine | 10.5 | 0.00 | 0.02 | 0.04 | 0.00 | 0.00 |
| C. p-chlorophenylalanine | 12.4 | 0.03 | 0.03 | 0.01 | 0.07 | 0.03 |

The mode of administration is oral. With regard to dose levels, the following levels are used:

A. one oral dose daily: 32 mg./kg. for 2 days, then 320 mg./kg. for 2 days (total = 704 mg./kg.)

B. one oral dose daily: 32 mg./kg. for 2 days, then 320 mg./kg. for 8 days (total = 2,624 mg./kg.)

C. one oral dose daily: 100 mg./kg. for 10 (total = 1,000 mg./kg.)

EXAMPLE VIII

The table below illustrates the ability of p-chlorophenylalanine to lower 5-HT concentrations in the brain, whole blood, spleen and colon of rats 3 days after a dose of 316 mg./kg. has been administered intraperitoneally:

| 5HT levels (% of control 3 days after administration I.P.) | |
|---|---|
| brain | 7 ± 1 |
| whole blood | 37 ± 2 |
| spleen | 52 ± 5 |
| colon | 46 ± 13 |

EXAMPLE IX

The following table illustrates the influence on the urinary excretion of 5-hydroxylated indole derivatives, in a 24 hour period, before and after treatment with 200 mg./day of p-chlorophenylalanine in a 70 year old male patient with the carcinoid syndrome:

| Urine constituent | Before Treatment mg. | After One Week's Treatment mg. |
|---|---|---|
| 5-hydroxyindol acetic acid | 130–185 | 28–78 |
| 5-hydroxytryptophan | 7–19 | <2 |
| 5-hydroxytryptophol | Traces | Not detected |
| Serotonin | Not detected | Not detected |

EXAMPLE X

The following table shows the effect of p-chlorophenylalanine on urinary 5-hydroxyindole acetic oral excretion in five patients suffering from the carcinoid syndrome:

| Case No. | Dose of Drug gm./24 hr. | 5HIAA* mg./24 hr. | Percentage Reduction |
|---|---|---|---|
| 1 | 0 | 61 (57–64) | 0 |
|  | 1.0 | 30 (27–32) | 51 |
|  | 2.0 | 24 (22–27) | 61 |
|  | 3.0 | 17 (17–18) | 72 |
| 2 | 0 | 265 (220–288) | 0 |
|  | 1.0 | 156 (130–170) | 41 |
|  | 3.0 | 59 (51–67) | 78 |
|  | 4.0 | 58 (51–69) | 78 |
| 3 | 0 | 123 (107–143) | 0 |
|  | 1.0 | 46 (42–49) | 63 |
|  | 2.0 | 34 (28–49) | 72 |
|  | 4.0 | 17 (16–18) | 86 |
| 4 | 0 | 283 (259–320) | 0 |
|  | 1.0 | 74 (67–80) | 71 |
|  | 2.0 | 53 (50–59) | 81 |
|  | 3.0 | 51 (43–63) | 82 |
|  | 4.0 | 34 (30–41) | 88 |
| 5 | 0 | 361 (304–427) | 0 |
|  | 1.0 | 259 (208–286) | 28 |
|  | 2.0 | 171 (131–191) | 53 |
|  | 3.0 | 99 (63–93) | 73 |
|  | 4.0 | 72 (55–88) | 80 |
| Normal Range |  | 0–9 |  |

*Values shown are averages (ranges) of results on at least 3 separate days during control and treatment periods at dosage indicated.

What is claimed is:

1. The method of lowering serotonin levels in a human and thereby alleviating symptoms of the carcinoid tumor syndrome which comprises administering daily to the human in need of such treatment from about 1 to about 70 mg./kg. of body weight of p-chlorophenylalanine or a pharmaceutically acceptable acid addition salt thereof.

* * * * *

UNITED STATES PATENT OFFICE
CERTIFICATE OF CORRECTION

Patent No. 3,686,414      Dated August 22, 1972

Inventor(s) Billie Kenneth Koe

It is certified that error appears in the above-identified patent and that said Letters Patent are hereby corrected as shown below:

Format page, column 1, after data element "[72]" should read -- Inventor: Billie Kenneth Koe, Gales Ferry, Connecticut --;

between data elements [72] and [22] should read -- [73] Assignee: Pfizer Inc., New York, New York --.

Signed and sealed this 3rd day of April 1973.

(SEAL)
Attest:

EDWARD M. FLETCHER, JR.        ROBERT GOTTSCHALK
Attesting Officer                Commissioner of Patents